: US008789009B2

(12) United States Patent
Lee et al.

(10) Patent No.: US 8,789,009 B2
(45) Date of Patent: Jul. 22, 2014

(54) EMF MODEL SYNCHRONIZATION METHOD AND SYSTEM

(75) Inventors: Joo Chul Lee, Daejeon (KR); Tae Man Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1066 days.

(21) Appl. No.: 12/788,651

(22) Filed: May 27, 2010

(65) Prior Publication Data

US 2011/0072410 A1 Mar. 24, 2011

(30) Foreign Application Priority Data

Sep. 22, 2009 (KR) .................. 10-2009-0089612

(51) Int. Cl.
*G06F 9/44* (2006.01)
(52) U.S. Cl.
USPC ........................... 717/104; 717/105; 717/113
(58) Field of Classification Search
None
See application file for complete search history.

(56) References Cited

U.S. PATENT DOCUMENTS

| 8,001,519 | B2 * | 8/2011 | Conallen et al. ............... | 717/105 |
| 8,296,721 | B2 * | 10/2012 | Sivaram ......................... | 717/104 |
| 2004/0153994 | A1 * | 8/2004 | Bates et al. ..................... | 717/110 |
| 2006/0101445 | A1 * | 5/2006 | Carbajales et al. ............ | 717/165 |
| 2007/0079299 | A1 | 4/2007 | Daly | |
| 2007/0277151 | A1 * | 11/2007 | Brunel et al. .................. | 717/113 |
| 2008/0046864 | A1 * | 2/2008 | Bai et al. ........................ | 717/105 |
| 2009/0150859 | A1 * | 6/2009 | Cummings et al. ........... | 717/104 |
| 2009/0158246 | A1 * | 6/2009 | Sifter et al. .................... | 717/105 |
| 2009/0172636 | A1 * | 7/2009 | Griffith et al. ................. | 717/113 |
| 2009/0313281 | A1 * | 12/2009 | Lowry et al. ................... | 707/102 |
| 2010/0042972 | A1 * | 2/2010 | Cacenco et al. ............... | 717/106 |
| 2010/0050154 | A1 * | 2/2010 | Balasubramanian ......... | 717/113 |
| 2010/0083212 | A1 * | 4/2010 | Fritzsche et al. .............. | 717/104 |
| 2010/0162225 | A1 * | 6/2010 | Huang et al. ................... | 717/171 |

OTHER PUBLICATIONS

Garces et al. Managing Model Adaptation by Precise Detection of Metamodel Changes, Lecture Notes in Computer Science vol. 5562, 2009, pp. 34-49. Retrieved on [Mar. 6, 2014] Retrieved from the Internet: URL<http://link.springer.com/chapter/10.1007/978-3-642-02674-4_4>.*

Xiong et al. Towards Automatic Model Synchronization from Model Transformations, Proceedings of the twenty-second IEEE/ACM international conference on Automated software engineering, 2007, pp. 164-173, Retrieved on [Mar. 6, 2014] Retrieved from the Internet: URL<http://dl.acm.org/citation.cfm?id=1321631.1321657>.*

(Continued)

*Primary Examiner* — Thuy Dao
*Assistant Examiner* — Cheneca Smith
(74) *Attorney, Agent, or Firm* — Kile Park Reed & Houtteman PLLC

(57) ABSTRACT

Provided are an EMF model synchronization method and system. The system calculates a weight based on a hierarchy for an object identifier in a changed model, when the change of the model occurs in an EMF model which has an XML element path as an attribute. The system accumulates the calculated weight to a sum of weights. When the sum of weights becomes greater than the threshold value, the system simultaneously updates all models which are changed until the sum of weights becomes greater than the threshold value, thereby synchronizing change contents. As a hierarchy of an identifier changed on an XML path becomes higher, the weight is determined to have a larger value.

13 Claims, 5 Drawing Sheets

(56) References Cited

OTHER PUBLICATIONS

Javier Torres, "Build an Eclipse plug-in to navigate content in an EMF model", developerWorks—Technical Report, IBM, Oct. 16, 2007, http://www.ibm.com/developerworks/kr/library/os-eclipse-emf/.

Sai Tung On et al., "Lazy-Update B+-Tree for Flash Devices", Proc. of the 10th MDM, IEEE, pp. 323-328, May 18, 2009.

Gregory Cobena et al., "Detecting Changes in XML Documents", Proceedings of the 18th International Conference on Data Engineering (ICDE '02), pp. 41-52, Feb. 26, 2002.

\* cited by examiner

EMF MODEL SYNCHRONIZATION METHOD AND SYSTEM

CROSS-REFERENCE TO RELATED APPLICATIONS

This application claims priority under 35 U.S.C. §119 to Korean Patent Application No. 10-2009-0089612, filed on Sep. 22, 2009, in the Korean Intellectual Property Office, the disclosure of which is incorporated herein by reference in its entirety.

TECHNICAL FIELD

The following disclosure relates to an Eclipse Modeling Framework (EMF) model synchronization method and system, and in particular, to an EMF model synchronization method and system, which synchronize a changed EMF model when change occurs in the EMF model that has an Extensible Markup Language (XML) element path as an attribute.

BACKGROUND

Eclipse is a multi-language software development environment comprising an integrated development environment and an extensible plug-in system. It is written primarily in Java and free software.

An EMF is a modeling framework and code generation facility for building tools and other applications based on a structured data model. The EMP provides tools and runtime support to produce a set of Java classes for the model, along with a set of adapter classes that enable viewing and command-based editing of the model, and a basic editor.

EMF consists of three fundamental pieces. FIG. 1 is a diagram illustrating three fundamental frameworks of EMF.

Referring to FIG. 1, three frameworks configuring an EMF 100 are an EMF (Core) 110, an EMF.Edit 120, and an EMF-.Codegen 130.

The EMF (Core) 110 includes a meta model for describing models and runtime support for the models including change notification, persistence support with default XMI serialization, and a very efficient reflective API for manipulating EMF objects generically.

The EMF.Edit 120 includes generic reusable classes for building editor 12 for EMF models.

The EMF.Codegen 130 is capable of generating everything needed to build a complete editor for an EMF model.

The EMF (core) 110 and the EMF.Edit 120 are operated by an eclipse platform 10, and respectively have functions of supporting the model 11 and the EMF editor 12. Such EMF runtimes again generate the model 11 and the EMF editor 12, which are user application sources, through the EMF code generator 130.

EMF is itself based on a model called Ecore. The Ecore model is the meta-model for all application models that are handled by EMF. An Ecore model has a class hierarchy structure. Classes consisting of an EMF model basically inherit any one of the classes of the class hierarchy structure and are thereby created.

When change occurs in a model, the EMF provides a method that may receive the notification of the change. That is, an Eobject class in an Ecore model may basically serve as a notifier. In this case, when the EMF is a model that refers to the instance of the original class, it may receive a notification on the content of change and use the received content of change in synchronizing each model.

An Automotive Open System Architecture (AUTOSAR) provides a software architecture, an application interface and a development method for the purpose of creating a common development platform for an Electric/Electronic Control Unit (ECU) that is applied to vehicles.

According to a method proposed by the AUTOSAR, four operations that include (1) inputting description, (2) setting system, (3) setting an ECU and (4) generating a source code are performed for configuring a specific ECU system architecture from a design model. Among the four operations, the operation of generating a source code that corresponds to the final stage uses an XML schema proposed by the AUTOSAR. As a method of modeling the XML schema, the EMF is mainly used. This is because the EMF autonomously generates a model, and moreover, provides a function that changes the existing Unified Modeling Language (UML) or XML into Ecore model.

An Ecore model that is built in this way is configured by having various relationships between class instances which configure a model. Accordingly, when the class instance configuring the model is changed, the Ecore model should inform all models of its own changing status. This, as described above, may be implemented through a notification method that is provided in an EMF itself.

However, in the case of a model that is configured in an EMF by using an AUTOSAR schema, the model does not refer to the instance of the original class but it has many attributes to which are referred by using a path that is configured with a short name as a value, in structure. In this case, therefore, when change occurs in a main model, the reference paths of objects that refer to the model should be changed. Consequently, as an entire model has a large size and becomes complicated, changing the reference path of the object whenever change occurs may become very inefficient.

SUMMARY

In one general aspect, an EMF model synchronization method includes: calculating a weight based on a hierarchy for an object identifier in a first model, that has been changed, when the change of the first model occurs in an EMF model having an attribute in which the EMF model references a path of an object; accumulating the calculated weight to a sum of weights; comparing the accumulated sum of weights with a predetermined threshold value; and updating the first model and all of second models, which are included in an update list, with a content of the change occurring in the model, when the sum of weights is greater than the threshold value.

Herein, as a hierarchy of an identifier changed on an XML path becomes higher, the weight based on the hierarchy may be calculated to have a large value.

Moreover, the model may be added to the update list, when the sum of weights is not greater than the threshold value.

The EMF model synchronization method may further include: determining whether a preset update timer expires, when the sum of weights is not greater than the threshold value; and updating the first model and all of the second models, which are included in the update list, with the content of the change occurring in the first model, when the update timer expires.

The first model may be a model which is written using an XML schema which is provided in an AUTOSAR.

In another general aspect, an EMF model synchronization method includes: adding a changed model to an update list, when the change of the model occurs in an EMF model having an attribute in which the EMF model references a path of an object; calculating a weight based on a hierarchy for an object identifier in the model; accumulating the calculated weight to a sum of weights; comparing the accumulated sum of weights with a predetermined threshold value; and updating all models, which are included in the update list, with a content of the change occurring in the model, when the sum of weights is greater than the threshold value.

In another general aspect, an EMF model synchronization system includes: a weight calculation unit calculating a weight based on a hierarchy for an object identifier in a changed model to accumulate the calculated weight to a sum of weights, when the change of the model occurs in an EMF model having an attribute in which the EMF model references a path of an object; a comparison unit comparing the accumulated sum of weights with a predetermined threshold value; an update list storing a list of the changed model; and an update unit updating a model, which are included in the update list, with a content of the change occurring in the model, when the sum of weights is greater than the threshold value.

The update list may be initialized, when updating is completed. The EMF model synchronization method may further include a timer allowing an update to be performed, when a predetermined certain time elapses.

Other features and aspects will be apparent from the following detailed description, the drawings, and the claims.

DETAILED DESCRIPTION OF EMBODIMENTS

Figure 1:
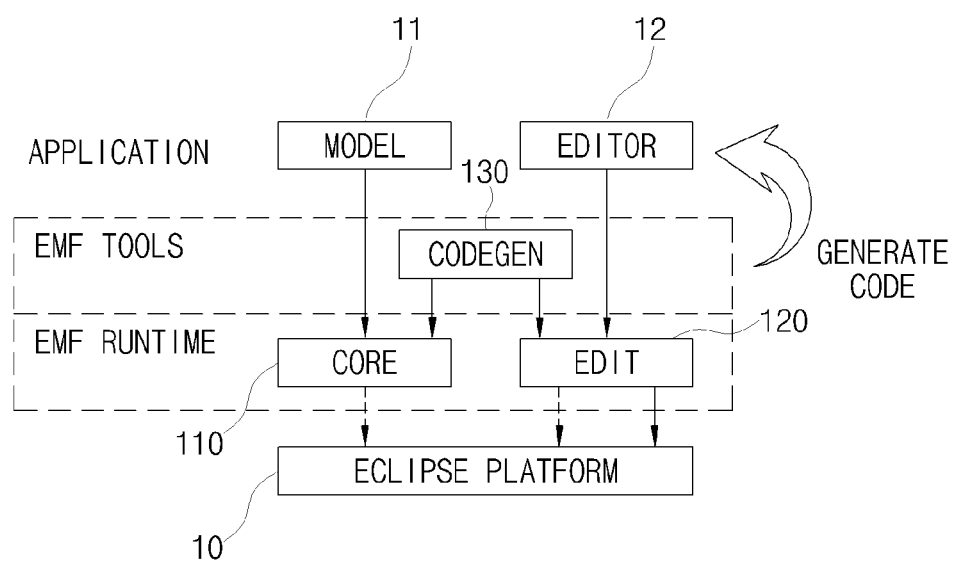
FIG. 1 is a block diagram illustrating an EMF for generating an EMF model.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In exemplary embodiments, an EMF model that is generated by changing an AUTOSAR XML schema will be described below as an example.

For example, an XML element path that indicates the specific element of a document represented with an XML is expressed as follows.

/AUTOSAR/Com/ComConfig/ComIPduGroup where each identifier classified by '/' represents the configuration hierarchy of an XML document. In the AUTOSAR according to an exemplary embodiment, the identifier is called a short name.

The EMF model that is generated by changing the AUTOSAR XML schema has the XML path as an attribute, and performs reciprocal referencing through the attribute. When the content of an identifier instead of the identifier of the final hierarchy among identifiers configuring the path is changed, therefore, all objects that have a path including the changed identifier as an attribute are updated according to the change. Accordingly, as the hierarchy of an identifier becomes higher, many updates are required.

In exemplary embodiments, for an object in which an XML element path attribute is changed, an model synchronization method according to an exemplary embodiment finds which hierarchy of an entire path the changed portion of the path is in, and gives a weight for each hierarchy in order to have a relatively large value when a corresponding hierarchy is high or to have a relatively small value when a corresponding hierarchy is low. The model synchronization method continuously accumulates the weight, and when the sum of weights exceeds a predetermined threshold value or a certain time elapses, the model synchronization method synchronizes all models by simultaneously updating the models. In this way, for simultaneously updating the models, the model synchronization method manages a material structure that manages the list of models to be updated. The list of models to be updated may be stored in a stack type of material structure.

Figure 2:
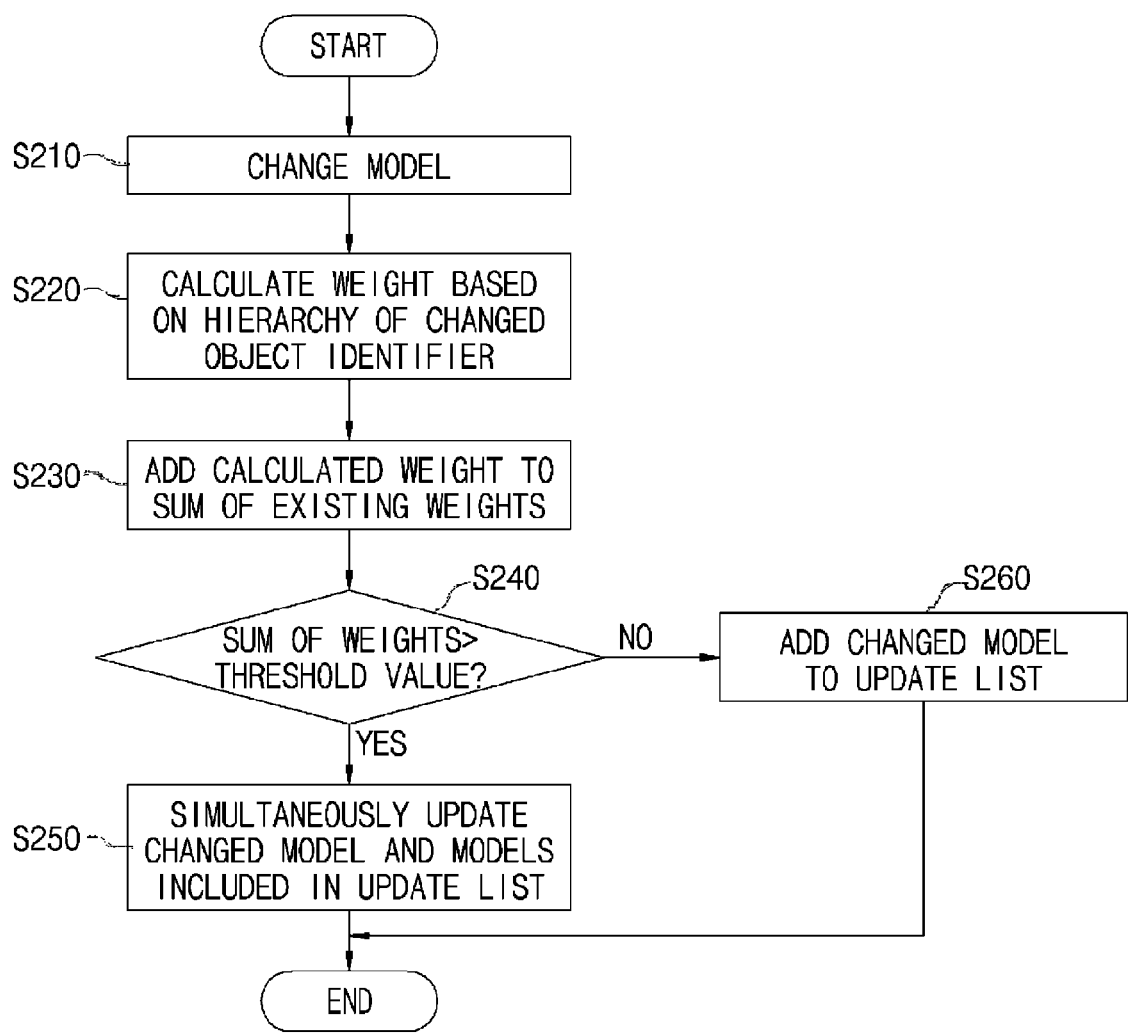
FIG. 2 is a flow chart illustrating a model synchronization method according to an exemplary embodiment.

FIG. 2 is a flow chart illustrating a model synchronization method according to an exemplary embodiment.

Referring to FIG. 2, when change occurs in a model in operation S210, the model synchronization method calculates a weight based on the hierarchy of an object identifier in the changed model in operation S220.

The weight is set to have a large value as the hierarchy of a changed object identifier becomes higher and to have a small value as the hierarchy of the changed object identifier becomes lower. In this case, the weight is set to be heuristic according to each application to which a model is applied.

By adding the calculated weight to the sum of existing weights in operation S230, the model synchronization method accumulates weights.

The model synchronization method compares the sum of weights with a predetermined threshold value in operation S240. The threshold value is not a value that is uniformly set, and is set as an appropriate value according to each application and a user's request.

When the sum of weights is less than the threshold value as a result of the comparison in operation S240, the model synchronization method adds the changed model (see operation S210) to an update list and does not perform updating.

When the sum of weights is greater than the threshold value as a result of the comparison in operation S240, the model synchronization method synchronizes all models by simultaneously updating the model that has been changed through operation S210 and models included in the update list in operation S250.

According to an exemplary embodiment, for preventing an update from being delayed for excessively long time, the model synchronization method may set a timer that allows updating to be performed when a certain time elapses after a preceding update although model change less than the threshold value occurs.

Figure 3:
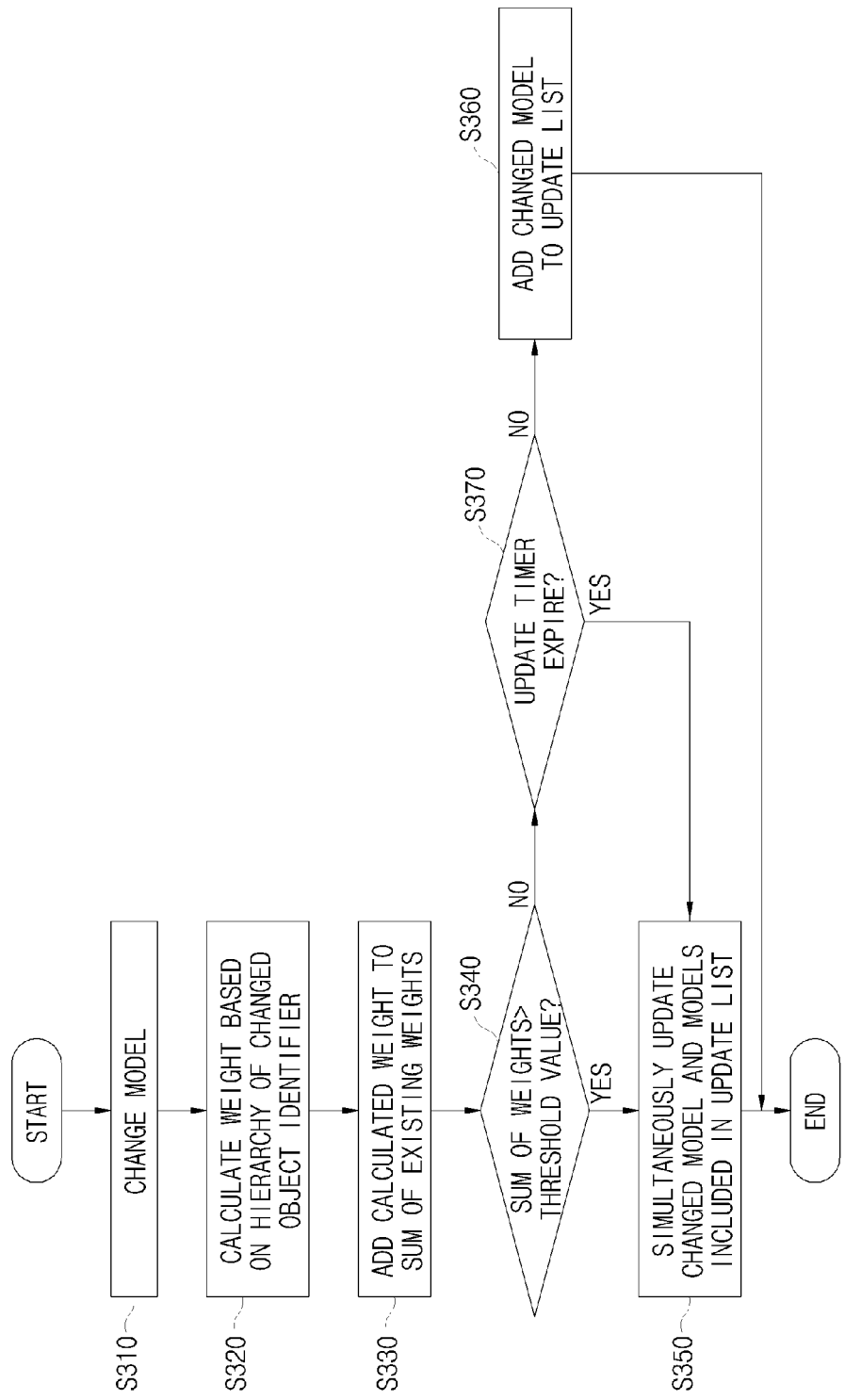
FIG. 3 is a flow chart illustrating a model synchronization method according to another exemplary embodiment.

FIG. 3 is a flow chart illustrating a model synchronization method according to another exemplary embodiment. The model synchronization method according to another exemplary embodiment that is illustrated in FIG. 3 calculates a weight when the change of a model occurs, accumulates the calculated weight and performs updating when the sum of weights exceeds a predetermined threshold value. These basic operations are similar to operations that have been described above with reference to FIG. 2.

Referring to FIG. 3, when change occurs in a model in operation S310, a model synchronization method according to another exemplary embodiment calculates a weight based on the hierarchy of an object identifier in the changed model in operation S320. The model synchronization method adds the calculated weight to the sum of existing weights in operation S330, and compares the sum of weights with a predetermined threshold value in operation S340. When the sum of weights is greater than the threshold value, the model synchronization method simultaneously updates the model that has been changed through operation S310 and models included in the update list in operation S350.

When the sum of weights is less than the threshold value as a result of the comparison in operation S340, the model synchronization method checks whether an update timer expires in operation S370.

When the update timer expires as a result of the check in operation S370, the model synchronization method synchronizes all models by simultaneously updating the model that has been changed through operation S310 and models included in the update list in operation S350.

As described above, since the update timer is set for preventing an update based on the change of a model from being delayed for excessively long time, it may be set to an appropriate time according to each application. When the simultaneous updates of models are performed due to the expiration of the update timer, the update timer is reset When the update timer does not expire as a result of the check in operation S370, the model synchronization method adds the changed model (see operation S310) to the update list in operation S360 and does not perform updating.

Moreover, when change occurs in a model, a corresponding model may be first added to the update list before calculating a weight.

Figure 4:
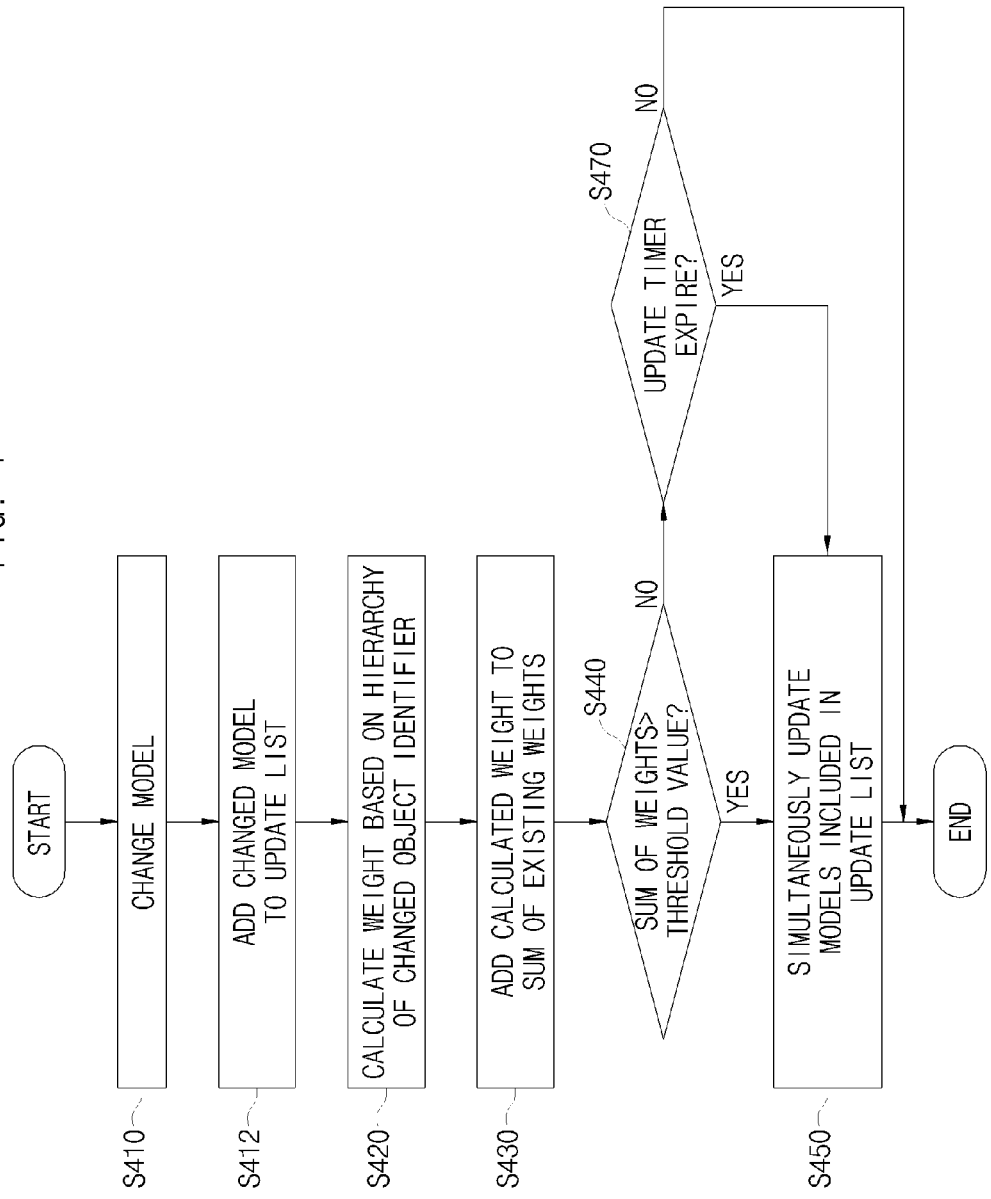
FIG. 4 is a flow chart illustrating a model synchronization method according to another exemplary embodiment.

FIG. 4 is a flow chart illustrating a model synchronization method according to yet another exemplary embodiment. In FIG. 4, when change occurs in a model, a corresponding model is first added to an update list and succeeding operations are performed.

Referring to FIG. 4, when change occurs in a model in operation S410, a model synchronization method according to another exemplary embodiment adds the changed model to the update list in operation S412.

The model synchronization method calculates a weight based on the hierarchy of an object identifier in the changed model in operation S420, and adds the calculated weight to the sum of existing weights in operation S430. The model synchronization method compares the sum of weights with a predetermined threshold value in operation S440. When the sum of weights is greater than the threshold value, the model synchronization method simultaneously updates models included in the update list in operation S450. When the sum of weights is less than the threshold value, the model synchronization method checks whether an update timer expires in operation S470. When the update timer expires as a result of the check in operation S470, the model synchronization method simultaneously updates models included in the update list in operation S450. When the update timer does not expire, the model synchronization method does not perform updating.

Figure 5:
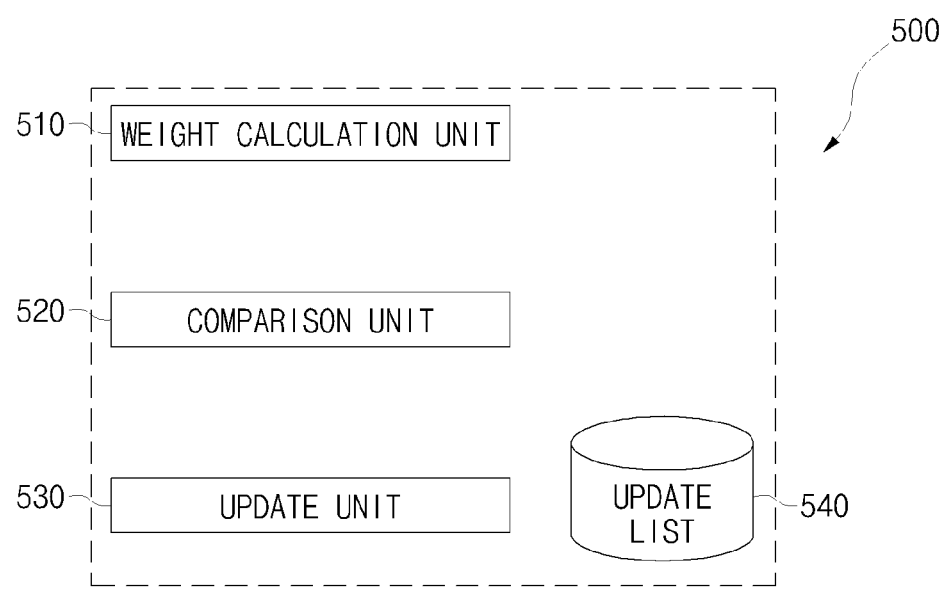
FIG. 5 is a block diagram schematically illustrating an EMF model synchronization system according to an exemplary embodiment.

FIG. 5 is a block diagram schematically illustrating an EMF model synchronization system according to an exemplary embodiment.

Referring to FIG. 5, an EMF model synchronization system 500 according to an exemplary embodiment includes a weight calculation unit 510, a comparison unit 520, an update unit 530, and an update list 540.

When change occurs in a model, the weight calculation unit 510 calculates a weight based on the hierarchy of an object identifier in the changed model and accumulates the calculated weight to the sum of preceding weights to calculate a new weight.

The comparison unit 520 compares a weight calculated by the weight calculation unit 510 with a predetermined threshold value.

When the weight is greater than the threshold value as the comparison result of the comparison unit 520, the update unit 530 simultaneously updates models that are stored in the update list 540.

As a material structure that stores the list of changed models, the update list 540 may be configured in a stack type. When change occurs in a model, a corresponding model may be immediately added to the update list 540. Alternatively, when the weight is less than the threshold value as the comparison result of the comparison unit 520, a corresponding model may be added to the update list 540. Once an update is completed, the update list 540 is again initialized.

As an exemplary embodiment, the EMF model synchronization system 500 may further include a timer setting unit (not shown) that sets a timer in order to simultaneously perform updates when a certain time elapses although a weight does not exceed a predetermined threshold value.

In exemplary embodiments, the EMF model that is written through the XML schema provided in the AUTOSAR has been described above as an example, but the model synchronization method according to exemplary embodiments is not limited thereto. The model synchronization method according to exemplary embodiments may be applied for other EMF model that has an XML path as an attribute.

The model synchronization method according to exemplary embodiments can also be embodied as computer readable codes on a computer-readable storage medium. The computer-readable storage medium is any data storage device that can store data which can be thereafter read by a computer system. Examples of the computer-readable storage medium include ROMs, RAMs, CD-ROMs, DVDs, magnetic tapes, floppy disks, registers, buffers, optical data storage devices, and carrier waves (such as data transmission through the Internet). The computer-readable storage medium can also be distributed over network coupled computer systems so that the computer readable codes are stored and executed in a distributed fashion. Also, functional programs, codes, and code segments for accomplishing the present invention can be easily construed by programmers skilled in the art to which the present invention pertains.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An Eclipse Modeling Framework (EMF) model synchronization method executed by a processor, the method comprising:
calculating a weight based on a hierarchy for an object identifier in a first model that has been changed, when the change of the first model occurs in an EMF model having an attribute in which the EMF model references a path of an object;
accumulating the calculated weight to a sum of weights;
comparing the accumulated sum of weights with a predetermined threshold value; and
updating the first model and all of second models, which are comprised in an update list, with a content of the change occurring in the first model, when the sum of weights is greater than the threshold value,
wherein, as a hierarchy of an identifier changed on an Extensible Markup Language (XML) path becomes higher, the weight based on the hierarchy is calculated to have a large value.

2. The EMF model synchronization method of claim 1, further comprising:
adding the first model to the update list, when the sum of weights is not greater than the threshold value.

3. The EMF model synchronization method of claim 1, further comprising:
determining whether a preset update timer expires, when the sum of weights is not greater than the threshold value; and
updating the first model and all of the second models, which are comprised in the update list, with the content of the change occurring in the first model, when the update timer expires.

4. The EMF model synchronization method of claim 3, further comprising:
resetting the update timer when the update timer expires.

5. The EMF model synchronization method of claim 1, wherein the first model is a model which is written using an Extensible Markup Language (XML) schema which is provided in an Automotive Open System Architecture (AUTOSAR).

6. An Eclipse Modeling Framework (EMF) model synchronization method executed by a processor, the method comprising:
adding a changed first model to an update list, when the change of the first model occurs in an EMF model having an attribute in which the EMF model references a path of an object;
calculating a weight based on a hierarchy for an object identifier in the first model;
accumulating the calculated weight to a sum of weights;
comparing the accumulated sum of weights with a predetermined threshold value; and
updating all models, which are comprised in the update list, with a content of the change occurring in the first model, when the sum of weights is greater than the threshold value,
wherein the weight based on the hierarchy is calculated to have a relatively high value, when the hierarchy is high, and the weight based on the hierarchy is calculated to have a relatively low value, when the hierarchy is low.

7. The EMF model synchronization method of claim 6, further comprising:
determining whether a preset update timer expires, when the sum of weights is not greater than the threshold value; and
updating all the models, which are comprised in the update list, with the content of the change occurring in the first model, when the update timer expires.

8. The EMF model synchronization method of claim 7, further comprising:
resetting the update timer when the update timer expires.

9. The EMF model synchronization method of claim 6, wherein the first model is a model which is written using an Extensible Markup Language (XML) schema which is provided in an Automotive Open System Architecture (AUTOSAR).

10. An Eclipse Modeling Framework (EMF) model synchronization system stored in a non-transitory computer-readable medium, the system comprising:
a weight calculation unit configured to calculate a weight based on a hierarchy for an object identifier in a changed first model and to accumulate the calculated weight to a sum of weights, when the change of the first model occurs in an EMF model having an attribute in which the EMF model references a path of an object;
a comparison unit configured to compare the accumulated sum of weights with a predetermined threshold value;
an update list configured to store a list of changed models including the changed first model; and
an update unit configured to update the changed models comprised in the update list with a content of the change occurring in the first model, when the sum of weights is greater than the threshold value,
wherein as a hierarchy of an identifier changed on an Extensible Markup Language (XML) path becomes higher, the weight based on the hierarchy is calculated to have a larger value.

11. The EMF model synchronization system of claim 10, wherein the first model is written using an Extensible Markup Language (XML) schema which is provided in an Automotive Open System Architecture (AUTOSAR).

12. The EMF model synchronization system of claim 10, wherein the update list is initialized, when the update unit completes updating.

13. The EMF model synchronization system of claim 10, further comprising:
a timer configured to allow the update unit to perform updating, when a predetermined certain time elapses.

* * * * *